Figure 1:
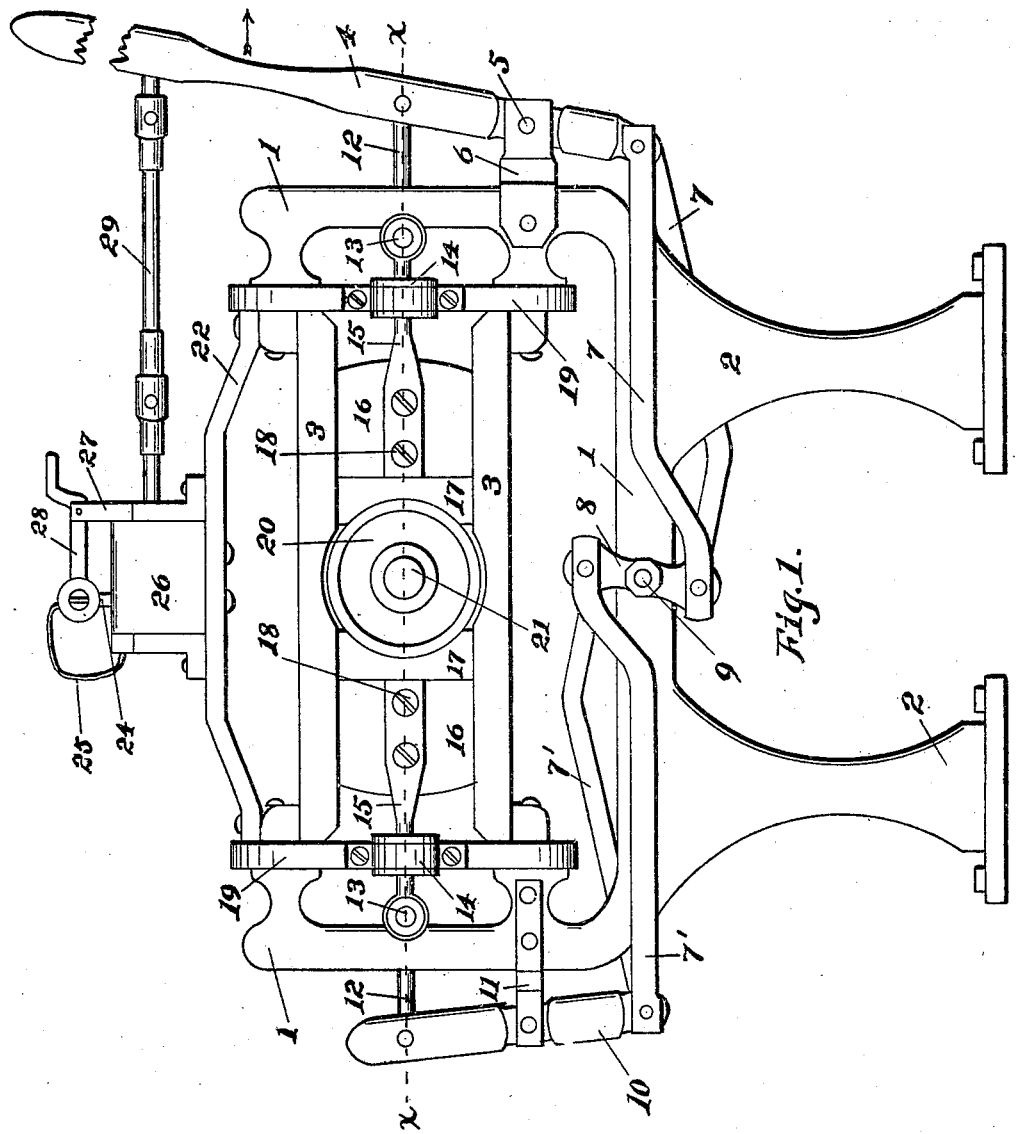

H. G. BROWN.
BRAKE FOR MACHINERY.
APPLICATION FILED OCT. 18, 1909.

961,099.

Patented June 14, 1910.
2 SHEETS—SHEET 1.

Witnesses
E. V. Simpson
Jos. F. Simmons.

Herman G Brown
Inventor
by J. M. Thomas
Attorney

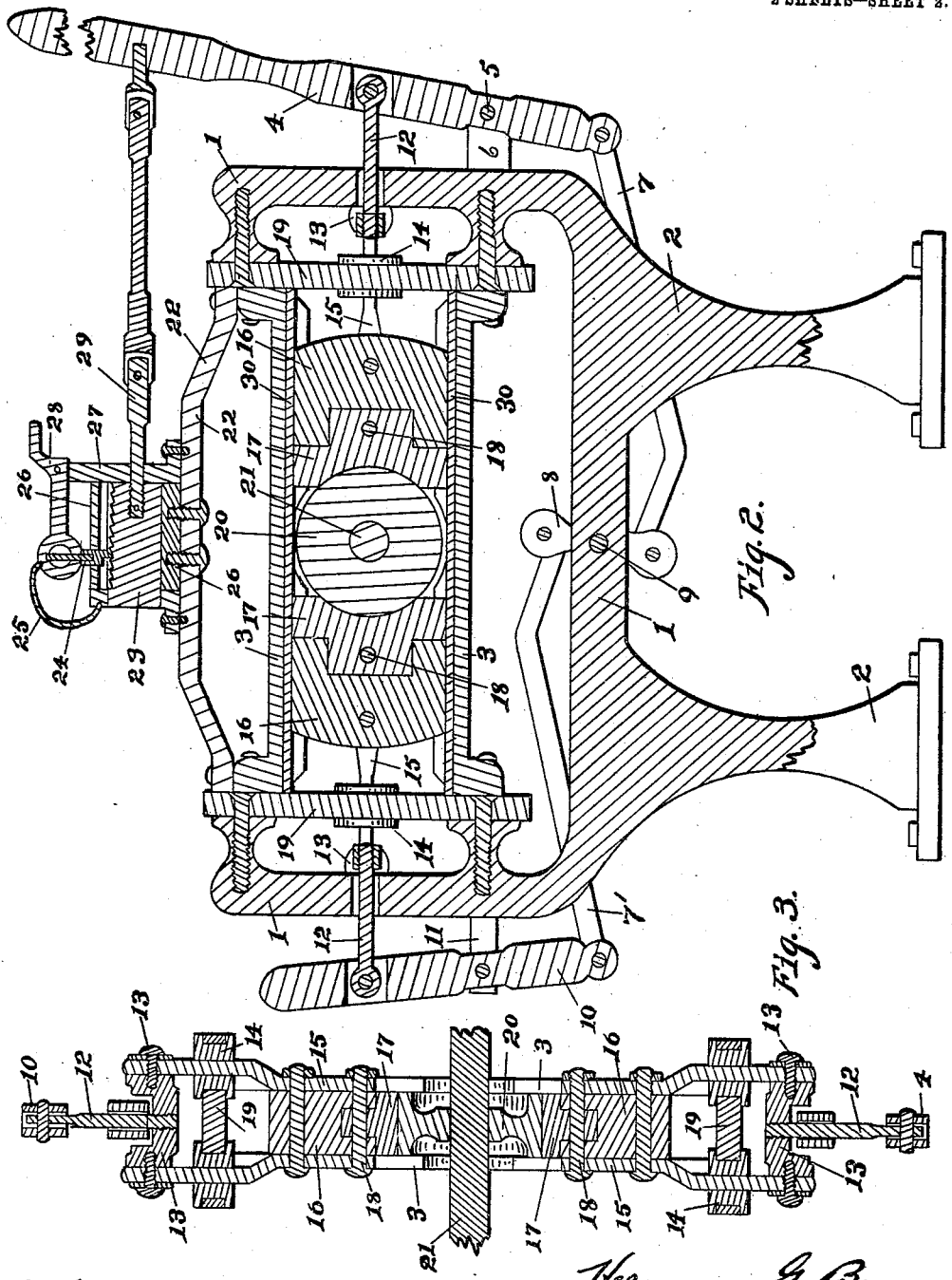

UNITED STATES PATENT OFFICE.

HERMAN G. BROWN, OF SALT LAKE CITY, UTAH, ASSIGNOR OF ONE-HALF TO AUGUSTUS F. MOODY, OF SALT LAKE CITY, UTAH.

BRAKE FOR MACHINERY.

961,099.  Specification of Letters Patent.  Patented June 14, 1910.

Application filed October 18, 1909. Serial No. 523,351.

*To all whom it may concern:*

Be it known that I, HERMAN G. BROWN, a citizen of the United States, residing at Salt Lake City, in the county of Salt Lake and State of Utah, have invented certain new and useful Improvements in Brakes for Machinery, of which the following is a specification.

The purpose of my invention is to provide a brake for stopping machinery or retarding the speed thereof by clutching the revolving shaft or a pulley thereon, and one in which the friction is applied evenly to the periphery of the parts clutched.

These objects I attain by the device illustrated in the accompanying drawings in which similar numerals of reference indicate like parts throughout the several figures.

Figure 1, is a side elevation. Fig. 2, is a vertical section thereof. Fig. 3 is a horizontal section on line x x of Fig. 1.

My brake consists of a frame 1, mounted on standards or feet 2, on which frame are carried the other parts of my brake. Two guides 3 having channels therein are bolted between the uprights of said frame, within which guides 3 are fitted slide plates 30 and between which guides are also slidably operated the brake shoes and their holders. On said frame 1 is carried the compound lever, which consists of a hand lever 4, fulcrumed by the pivot pin 5, to the horizontal arm 6, which arm 6 is attached to said frame 1. On the lower end of said lever 4 is pivoted one of the ends of the two link straps 7, the other ends of said link straps being pivoted to one end of the rocking lever 8, which is medially fulcrumed to said frame 1 by the bolt 9. To the other end of said rocking lever 8 is pivoted one end of each of the other link straps 7', the other ends of which straps are pivoted to the lower end of the short lever 10, a counterpart to the lower portion of said lever 4. Said short lever 10 is likewise fulcrumed to said frame 1 by the horizontal arm 11. To the upper end of the short lever 10, and also horizontally opposite thereto, to said lever 4, is pivoted one end of each of the rods 12. The other end of each of said rods 12 is secured to the rocking shafts 13, each of which rocking shafts carries two arms 15, that are mounted in split bearings 14. The other ends of said arms 15 are securely fastened to the brake shoe holders 16. Said brake shoe holders have provided therein mortises or openings in which is fitted the standard of the brake shoes 17, and are held therein by the screw pins 18. Said split bearings 14 are secured on vertical bearing plates 19, which are firmly fastened to said frame 1. Said brake shoes 17 are adapted and formed to clutch the friction pulley 20, which is securely fastened on the power driven shaft 21, of the machinery to be stopped or retarded. On the top of said frame 1 is securely fastened the base 22, for the ratchet 23. Said ratchet 23 has teeth provided in the upper part thereof, which are engaged by the dog 24. To the upper portion of said dog 24 is fitted a spring 25. Said ratchet 23 is inclosed in a housing 26. On one end of said housing is an upwardly extended, bifurcated bracket 27, within which bracket 27 is pivoted the release lever 28, one end of which is fitted to engage said dog 24. One end of said ratchet is connected with said lever 4 by the pivoted rod 29.

My brake is equally adapted for use by other than manual manipulation, by applying to said lever 4 other means to move said lever. When said lever 4 is moved in the direction of the arrow the brake shoes will be moved away from said pulley 20, and when moved in the other direction will engage said pulley 20, or shaft, and stop or retard the machinery, depending on the amount of power applied to said lever, the special purpose being to provide a clutch equal on both sides of said pulley.

Having thus described my invention I desire to secure by Letters Patent and claim:

1. In a brake of the class described, the combination of a frame, a lever fulcrumed thereto, link straps pivoted to the lower end thereof, the other end of said link straps being pivoted to one end of a rocking lever, other link straps which are pivoted to the upper end of said rocking lever, a short lever likewise fulcrumed to said frame and to the lower end of which lever are pivoted two of said link straps, guides having channels therein secured to said frame, brake-shoe holders adapted to operate in said channels, brake-shoes fitted in said holders and likewise adapted to operate in said channels and means to hold said first mentioned lever, as and for the purposes described.

2. In a machine of the class described, the combination of a frame, a lever pivoted thereto on one end, and means for holding and releasing said lever, a short lever pivoted to the other end of said frame, link straps connecting the lower end of each of said levers to opposite ends of a rocking lever medially fulcrumed to said frame, guides having channels therein and secured to said frame, brake-shoes and holders therefor adapted to move within said channels, one of which holders is pivoted to the upper end of said short lever, the other of said holders being pivoted to said first mentioned lever, as and for the purposes described.

In testimony whereof I have affixed my signature in presence of two witnesses.

HERMAN G. BROWN.

Witnesses:
  A. H. CUTRIGHT,
  W. E. WOOD.